(12) United States Patent
Bromm et al.

(10) Patent No.: US 7,399,818 B2
(45) Date of Patent: Jul. 15, 2008

(54) CURABLE COMPOSITION AND USE THEREOF

(75) Inventors: Karl Allen Bromm, Forest Grove, PA (US); Xun Tang, Dresher, PA (US); Barry Weinstein, Dresher, PA (US)

(73) Assignee: Rohm and Haas Company, Philadelphia, PA (US)

( * ) Notice: Subject to any disclaimer, the term of this patent is extended or adjusted under 35 U.S.C. 154(b) by 404 days.

(21) Appl. No.: 11/053,799

(22) Filed: Feb. 9, 2005

(65) Prior Publication Data

US 2005/0209410 A1    Sep. 22, 2005

Related U.S. Application Data

(60) Provisional application No. 60/636,155, filed on Dec. 15, 2004, provisional application No. 60/553,652, filed on Mar. 16, 2004.

(51) Int. Cl.
*C08F 120/06* (2006.01)
*C08F 220/06* (2006.01)

(52) U.S. Cl. .................. 526/317.1; 526/318; 526/307.4; 526/307.5

(58) Field of Classification Search .............. 526/317.1, 526/318, 307.4, 307.5
See application file for complete search history.

(56) References Cited

U.S. PATENT DOCUMENTS

| | | | |
|---|---|---|---|
| 4,076,917 A | 2/1978 | Swift et al. | |
| 4,621,127 A | 11/1986 | Denzinger et al. | |
| 4,861,686 A | 8/1989 | Snyder | |
| 4,906,716 A | 3/1990 | Yang et al. | |
| 5,073,612 A | 12/1991 | Irie et al. | |
| 5,308,990 A | 5/1994 | Takahashi et al. | |
| 5,427,587 A | 6/1995 | Arkens et al. | |
| 5,661,213 A | 8/1997 | Arkens et al. | |
| 5,763,524 A | 6/1998 | Arkens et al. | |
| 6,071,994 A | 6/2000 | Hummerich et al. | |
| 6,099,773 A * | 8/2000 | Reck et al. | 264/109 |
| 6,136,916 A | 10/2000 | Arkens et al. | |
| 6,221,973 B1 * | 4/2001 | Arkens et al. | 525/327.7 |
| 6,331,350 B1 * | 12/2001 | Taylor et al. | 428/221 |
| 2004/0044151 A1 | 3/2004 | Yoneda et al. | |
| 2004/0254290 A1 | 12/2004 | Rodrigues et al. | |
| 2005/0038193 A1 | 2/2005 | Blankenship et al. | |

FOREIGN PATENT DOCUMENTS

| | | |
|---|---|---|
| DE | 4205601 | 8/1993 |
| DE | 4344149 A1 | 6/1995 |
| DE | 19621573 A1 | 12/1997 |
| DE | 19949591 A1 | 4/2001 |
| DE | 19949592 A1 | 4/2001 |
| DE | 19949593 A1 | 4/2001 |
| EP | 0 392 353 B1 | 4/1990 |
| EP | 0437 268 B1 | 1/1994 |
| EP | 0 697 422 B1 | 8/1999 |
| EP | 0 748 777 B1 | 8/1999 |
| EP | 0 792 890 B1 | 12/1999 |
| EP | 1 300 426 A1 | 4/2003 |
| EP | 0942 015 B1 | 5/2004 |
| WO | WO 96/15075 | 5/1996 |

* cited by examiner

*Primary Examiner*—Ling-Siu Choi
(74) *Attorney, Agent, or Firm*—Andrews E. C. Merriam

(57) ABSTRACT

A curable composition including a compound, containing as polymerized units, carboxylic acid groups, anhydride groups, or salts thereof, and a styrene, α-methyl styrene, butyl (meth) acrylate, methyl methacrylate, ethyl (meth)acrylate, monoalkyl (meth)acrylamide, or di-alkyl (meth)acrylamide ethylenically unsaturated monomer having a solubility in water of less than 2 g/100 g water at 25° C.; wherein the compound is either admixed with or copolymerized with a hydroxyl group-containing compound; the curable composition contains from about 3 to about 25 weight percent, based on the total weight of polymerized monomers in the curable composition, of the ethylenically unsaturated monomer; the ratio of the number of equivalents of the carboxylic acid groups, anhydride groups, or salts thereof to the number of equivalents of the hydroxyl groups is from about 1/0.01 to about 1/3, is provided. Also provided is a method for treating a substrate with the curable composition, articles prepared by the method of the invention.

14 Claims, No Drawings

CURABLE COMPOSITION AND USE THEREOF

CROSS REFERENCE TO RELATED PATENT APPLICATIONS

This is a non-provisional application of prior pending U.S. provisional application Ser. No. 60/553,652 filed Mar. 16, 2004 and U.S. provisional application Ser No. 60/636,155 filed Dec. 15, 2004.

This invention relates to a curable composition, and its use for treating substrates, and to articles prepared by the method, including heat-resistant nonwoven fabrics, wood-containing articles and powder coated articles. In particular the curable composition includes a compound, containing as polymerized units, carboxylic acid groups, anhydride groups, or salts thereof, and a styrene, α-methyl styrene, butyl (meth)acrylate, methyl methacrylate, ethyl (meth)acrylate, mono-alkyl (meth)acrylamide, or di-alkyl (meth)acrylamide ethylenically unsaturated monomer having a solubility in water of less than 2 g/100 g water at 25° C.; wherein the compound is either admixed with, or copolymerized with a hydroxyl group-containing compound; the curable composition contains from about 3 to about 25 weight percent, based on the total weight of polymerized monomers in the curable composition, of the ethylenically unsaturated monomer; the ratio of the number of equivalents of the carboxylic acid groups, anhydride groups, or salts thereof to the number of equivalents of the hydroxyl groups is from about $\frac{1}{0.01}$ to about $\frac{1}{3}$.

Many materials that utilize acrylic thermoset binders can be negatively affected by exposure to water. For example, glass fiber-containing materials incorporating acrylic thermoset binders tend to lose mechanical properties, becoming soft and limp when moist or wet; while wood-containing materials that utilize an acrylic thermoset binder often suffer from mold or bacterial growth, and where such wood-containing materials are multi-layered, delamination can be a problem. It is desirable that materials containing cured acrylic thermoset binders substantially retain the properties contributed by the cured binder, such as, for example, tensile strength, even upon exposure to water. Likewise, it is desirable that the cured binder not substantially detract from the essential characteristics of the material to which they are applied, as would be the case, for example, if the cured binder were to become too sticky under processing conditions, or too rigid or brittle. Even more desirable, is that the curable composition from which the cured binder is formed, contains or emits, during storage or curing, for example, little or, preferably, no formaldehyde, while providing an effective level of curing at a temperature, and for a time, acceptable for the substrate to be treated, and consistent with the lowest practical level of energy usage during processing.

U.S. Pat. No. 5,427,587 and 5,661,213 disclose a formaldehyde-free curable composition, and the use thereof, as a binder for heat-resistant non-wovens and cellulosic substrates. The composition includes (a) a polyacid bearing at least two carboxylic acid groups, anhydride groups, or the salts thereof; (b) a polyol bearing at least two hydroxyl groups; and (c) a phosphorous-containing accelerator, wherein the ratio of the number of equivalents of the carboxylic acid groups, anhydride groups, or salts thereof to the number of equivalents of the hydroxyl groups is from about $\frac{1}{0.01}$ to about $\frac{1}{3}$, and wherein the carboxyl groups, anhydride groups, or salts thereof are neutralized to an extent of less than about 35% with a fixed base. The patents do not disclose a curable composition containing a copolymer whose polymerized units include a styrene, α-methyl styrene, butyl (meth) acrylate, methyl methacrylate, ethyl (meth)acrylate, mono-alkyl (meth)acrylamide, or di-alkyl (meth)acrylamide monomer having a solubility of less than 2 g/100 g of water at 25° C.; wherein the curable composition contains from about 3 to about 25 weight percent of the polymerized ethylenically unsaturated monomer.

There remains a need for a formaldehyde-free curable composition that, upon curing, has improved wet-tensile strength yet retains other desirable properties. Applicants have found a curable composition that fulfills this need.

A first aspect of the present invention is a curable composition comprising (a) a polyacid copolymer comprising as polymerized units, a monomer comprising carboxylic acid groups, anhydride groups, or salts thereof, and from about 3 to about 25 weight percent, based on the total weight of polymerized monomers in the curable composition, of an ethylenically unsaturated monomer having a solubility of less than 2 g/100 g of water at 25° C., wherein said ethylenically unsaturated monomer is selected from the group consisting of ethyl (meth)acrylate, methyl methacrylate, butyl (meth)acrylate, styrene, α-methyl styrene, mono-alkyl acrylamide, and di-alkyl acrylamide; and (b) a hydroxyl group-comprising compound bearing at least two hydroxyl groups; wherein the ratio of the number of equivalents of said carboxylic acid groups, anhydride groups, or salts thereof to the number of equivalents of said hydroxyl groups is from about $\frac{1}{0.01}$ to about $\frac{1}{3}$.

A second aspect of the present invention is a curable composition comprising: (a) a polyacid copolymer comprising as polymerized units, a monomer comprising carboxylic acid groups, anhydride groups, or salts thereof, and an ethylenically unsaturated monomer having a solubility of less than 2 g/100 g of water at 25° C., wherein said ethylenically unsaturated monomer is selected from the group consisting of ethyl (meth)acrylate, methyl methacrylate, butyl (meth)acrylate, styrene, α-methyl styrene, mono-alkyl (meth)acrylamide, and di-alkyl (meth)acrylamide; (b) a polyacid homopolymer; and (C) a hydroxyl group-comprising compound bearing at least two hydroxyl groups; wherein said curable composition comprises from about 3 to about 25 weight percent, based on the total weight of polymerized monomers in the curable composition, of said ethylenically unsaturated monomer; wherein the ratio of the number of equivalents of said carboxylic acid groups, anhydride groups, or salts thereof to the number of equivalents of said hydroxyl groups is from about $\frac{1}{0.01}$ to about $\frac{1}{3}$.

A third aspect of the present invention is a curable composition, comprising a copolymer, comprising as polymerized units, an acid monomer comprising carboxylic acid groups, anhydride groups, or salts thereof; from about 3 to about 25 weight percent, based on the total weight of polymerized monomers in the curable composition, of an ethylenically unsaturated monomer having a solubility of less than 2 g/100 g of water at 25° C., wherein said ethylenically unsaturated monomer is selected from the group consisting of ethyl (meth)acrylate, methyl methacrylate, butyl (meth)acrylate, styrene, a-methyl styrene, mono-alkyl (meth)acrylamide, and di-alkyl (meth)acrylamide; and a hydroxyl group-comprising compound.

A fourth aspect of this invention is a method for treating a substrate comprising: (i) forming the curable composition of the first, second or third aspect; (ii) contacting said substrate with said curable composition; and (iii) heating said curable composition at a temperature of from 100° C. to 400° C.

A fifth aspect of this invention is a heat-resistant non-woven fabric, a wood-containing article, or a powder coated article prepared by the method of this invention.

The curable composition of the invention contains at least one compound containing carboxylic acid groups, anhydride groups, or salts thereof, at least one ethylenically unsaturated monomer having a solubility in water of less than 2 g/100 g of water at 25° C., and at least one hydroxyl group-containing compound. In one embodiment of the invention, the hydroxyl group-containing compound, and the polyacid copolymer containing the copolymerized carboxylic acid or anhydride group-containing compound and ethylenically unsaturated monomer having a solubility in water of less than 2 g/100 g of water, are independent components of the curable composition. In a different embodiment of the invention, the acid monomer, the ethylenically unsaturated monomer having a solubility in water of less than 2 g/100 g of water, and the hydroxyl group-containing compound are incorporated within the same copolymer backbone. "Copolymer component" is used herein to represent that portion of the curable composition that contains the carboxylic acid or anhydride group-containing compound, and is in the copolymeric form. Thus, in the former embodiment, the copolymer component is the polyacid copolymer; while in the latter embodiment, the copolymer component is the copolymer containing the copolymerized acid monomer, ethylenically unsaturated monomer, and hydroxyl group-containing compound.

The copolymer component of the curable composition includes, as polymerized units, at least one monomer including carboxylic acid groups, anhydride groups, or salts thereof, and at least one ethylenically unsaturated monomer having a solubility in water of less than 2 g/100 g of water at 25° C. As noted herein-above, in one embodiment of the invention, it further includes as polymerized units at least one hydroxyl-containing compound. The ethylenically unsaturated monomer is at least one of ethyl (meth)acrylate, methyl methacrylate, butyl (meth)acrylate, styrene, α-methyl styrene, monoalkyl (meth)acrylamide, or di-alkyl (meth)acrylamide. "(Meth)acrylate", as used herein, means either an acrylate or a methacrylate. "(Meth)acrylamide", as used herein, means either an acrylamide or a methacrylamide. The ethylenically unsaturated monomer is present in polymerized form in quantities of from about 3 to about 25 weight percent, preferably from about 3 to about 20 weight percent, more preferably from about 3 to about 15 weight percent, based on the total weight of polymerized monomer in the curable composition. The preferred amount of each of the ethylenically unsaturated monomers is as follows: from about 10 to about 25 weight percent ethyl (meth)acrylate, from about 10 to about 20 weight percent methyl methacrylate, from about 3 to about 15 weight percent butyl (meth)acrylate, from about 3 to about 15 weight percent styrene, from about 3 to about 15 weight percent α-methyl styrene from about 3 to about 8 weight percent t-octyl acrylamide, and from about 5 to about 15 weight percent t-butyl acrylamide. In those embodiments of the invention in which the ethylenically unsaturated monomer has a solubility in water of less than 1 g/100 g water at 25° C., it is preferred to use from about 3 to about 15 weight percent, based on the total weight of polymerized monomers in the curable composition, of the ethylenically unsaturated monomer. In those embodiments of the invention in which the ethylenically unsaturated monomer has a solubility in water of from 1 g/100 g to 2 g/100 g water at 25° C., it is preferred to use from about 10 to about 25 weight percent, based on the total weight of polymerized monomers in the curable composition, of the ethylenically unsaturated monomer. In one embodiment of the invention, the 3 to 25 weight percent proportion of the ethylenically unsaturated monomer is obtained by blending the polyacid copolymer with a polyacid homopolymer.

Suitable monomers including carboxylic acid groups, and salts thereof include, for example, methacrylic acid, acrylic acid, crotonic acid, fumaric acid, maleic acid, 2-methyl maleic acid, itaconic acid, citraconic acid, mesaconic acid, cyclohexenedicarboxylic acid, 2-methyl itaconic acid, α-methylene glutaric acid, monoalkyl maleates, and monoalkyl fumarates, and salts thereof. Suitable monomers including anhydride groups, and salts thereof, include ethylenically unsaturated anhydrides, such as, for example, maleic anhydride, itaconic anhydride, acrylic anhydride, and methacrylic anhydride, and salts thereof. Preferred monomers including carboxylic acid groups, anhydride groups, or salts are acrylic acid and maleic acid, and salts thereof, and maleic anhydride. Preferably, the monomers including carboxylic acid groups, anhydride groups, or salts are used at a level of from 1% to 99%, more preferably at a level of from 10% to 90% by weight, based on the weight of the polymer.

In one embodiment of the present invention, a macromolecular organic compound having a hydrophobic cavity is present in the polymerization medium used to form the copolymer component of the curable composition. Suitable techniques for using a macromolecular organic compound having a hydrophobic cavity are disclosed in, for example, U.S. Pat. No. 5,521,266. Macromolecular organic compounds having a hydrophobic cavity useful in the present invention include, for example, cyclodextrin or cyclodextrin derivatives; cyclic oligosaccharides having a hydrophobic cavity such as cycloinulohexose, cycloinuloheptose, or cycloinuloctose; calyxarenes; cavitands; or combinations thereof. Preferably, the macromolecular organic compound is β-cyclodextrin, more preferably methyl-β-cyclodextrin.

The copolymer component has a weight average molecular weight, as measured by aqueous GPC, of from 300 to 10,000,000. Preferred is a weight average molecular weight of from 500 to 250,000; more preferred is a weight average molecular weight of from 500 to 50,000, even more preferred is a weight average molecular weight of from 1,000 to 10,000.

In one embodiment of the invention, the curable composition further contains at least one low molecular weight polybasic carboxylic acid, anhydride or salt thereof having a molecular weight of 1000 or less, preferably 500 or less, and most preferably 200 or less. By "polybasic" is meant herein having at least two reactive acid functional groups (see e.g. *Hawley's Condensed Chemical Dictionary*, 14$^{th}$ Ed., 2002, John Wiley and Sons, Inc.). Examples of suitable low molecular weight polybasic carboxylic acids and anhydrides thereof include, for example, maleic acid; maleic anhydride, fumaric acid, succinic acid, succinic anhydride, sebacic acid, azelaic acid, adipic acid, citric acid, glutaric acid, tartaric acid, itaconic acid, trimellitic acid, hemimellitic acid, trimesic acid, tricarballytic acid, 1,2,3,4-butanetetracarboxylic acid, pyromellitic acid, oligomers of carboxylic acid, and the like, and salts thereof. Optionally, the low molecular weight polybasic carboxylic acid, anhydride or salt thereof may be mixed with the hydroxyl-containing compound, under reactive conditions, prior to mixing with the polyacid copolymer.

In one embodiment of the invention, the curable composition is a solid composition such as, for example, a powder or a film. The solid composition may be obtained by various methods of drying, such as, for example spray drying, fluidized bed drying, and the like. In a preferred embodiment, the curable composition is a curable aqueous composition. "Aqueous", as used herein, includes water, and mixtures of water and water-miscible solvents. In this embodiment, the copolymer component may be in the form of a solution of the copolymer component in an aqueous medium, such as, for examples, an alkali-soluble resin that has been solubilized in a basic medium; in the form of an aqueous dispersion, such as, for example, an emulsion-polymerized dispersion; or in the form of an aqueous suspension.

In those embodiments of the invention where the copolymer component is in the form of an aqueous dispersion, or an aqueous suspension, and low levels of pre-crosslinking or gel content are desired, low levels of copolymerized multi-ethylenically unsaturated monomers such as, for example, allyl methacrylate, diallyl phthalate, 1,4-butylene glycol dimethacrylate, 1,6-hexanedioldiacrylate, and the like, can be used at a level of from about 0.01% to about 5%, by weight based on the weight of the copolymer.

In those embodiments of the invention where the copolymer component is in the form of an aqueous dispersion, the average diameter of the copolymer particles can be from 80 nanometers to 1000 nanometers, as measured using a Brookhaven BI-90 Particle Sizer, which employs a light scattering technique. However, polymodal particle size distributions, such as those disclosed in U.S. Pat. Nos. 4,384,056 and 4,539,361, hereby incorporated herein by reference, can be employed.

In one embodiment of the invention, the copolymer component is in the form of an aqueous dispersion, and the copolymer particles are made up of two or more mutually incompatible copolymers. These mutually incompatible copolymers can be present in various morphological configurations such as, for example, core/shell particles, core/shell particles with shell phases incompletely encapsulating the core, core/shell particles with a multiplicity of cores, interpenetrating network particles, and the like.

The copolymer component of the present invention is an addition copolymer, prepared by free radical addition polymerization. In the embodiment of the invention where the composition is in the form of a solid, the copolymer component can be prepared, for example, in a hot tube, in the absence of solvent. In other embodiments of the invention, the copolymer component can be prepared by solution polymerization, emulsion polymerization, or suspension polymerization techniques for polymerizing ethylenically-unsaturated monomers, which are well known in the art. When the copolymer component is prepared by emulsion polymerization, anionic or nonionic surfactants, or mixtures thereof, can be used. The polymerization can be carried out by various means, such as, for example, with all of the monomer in the reaction kettle at the beginning of the polymerization reaction, with a portion of the monomer in emulsified form present in the reaction kettle at the beginning of the polymerization reaction, or with a small particle size emulsion polymer seed present in the reaction kettle at the beginning of the polymerization reaction. The preferred method of polymerization is by gradual addition solution polymerization in water. In this method, part, or all of the ethylenically unsaturated monomer having a solubility in water of less than 2 g/100 g water at 25° C. can be metered into the reactor.

The manner in which the monomers may be fed to a reaction container or vessel may vary. Different monomer feed profiles affect the amount of gel, and thus the clarity, of the curable composition. By "monomer feeds" is meant herein the monomers, that are deposited into the container or vessel in which the polymerization reaction takes place. In those embodiments of the invention in which the polyacid copolymer and the hydroxyl containing compound are independent components of the curable composition, the monomer feeds include the monomer containing carboxylic acid groups, anhydride groups, or salts thereof, and the ethylenically unsaturated monomer having a solubility of less than 2 g/100 g of water at 25° C. In those embodiments of the invention in which the acid monomer, ethylenically unsaturated monomer, and hydroxyl-containing compound are incorporated in the same polymer backbone, the monomer feeds further include a hydroxyl-group containing compound.

In one embodiment of the invention, the composition of the monomer feeds remains substantially the same throughout the polymerization process. A non-limiting example of a suitable feed profile may be, for example, a monomer feed of 90 weight percent, based on total monomer feeds, of the monomer containing carboxylic acid groups, anhydride groups, or salts thereof, and 10 weight percent, based on total monomer feeds, of the ethylenically unsaturated monomer, fed over the duration of the raw material feeds to the reaction container. The proportion of the monomer containing carboxylic acid groups, anhydride groups, or salts thereof, and the ethylenically unsaturated monomer, may be selected to obtain the desired polymer product. A hydroxyl group-containing compound may be fed with the monomer containing carboxylic acid groups, anhydride groups, or salts thereof, and/or with the ethylenically unsaturated monomer.

Alternatively, the monomer feed composition may be adjusted during the duration of the raw material feeds. In one embodiment of the invention, a monomer feed composition containing the monomer containing carboxylic acid groups, anhydride groups, or salts thereof; the ethylenically unsaturated monomer having a solubility of less than 2 g/100 g of water at 25° C.; and optionally the hydroxyl-group containing compound, is fed from a first monomer vessel into the reaction container, during a first feed period. The composition of the monomer feed remains substantially the same during the first feed period. The composition of the monomer feed is then adjusted. The monomer feed composition adjustment is implemented by feeding at least one shot of additional ethylenically unsaturated monomer, additional monomer containing carboxylic acid groups, anhydride groups, or salts thereof, optionally additional hydroxyl-group-containing compound, or a combination thereof, from at least one second monomer vessel into the monomer feed in the first monomer vessel. During at least one second feed period, the adjusted monomer feed is fed from the first monomer vessel into the reaction container. A non-limiting example of a suitable feed profile may be, for example, during a first feed period, feeding a monomer feed of 90 weight percent, based on total monomer feeds, of the monomer containing carboxylic acid groups, anhydride groups, or salts thereof, and 5 weight percent, based on total monomer feeds, of the ethylenically unsaturated monomer, from a first monomer vessel into a reaction container; feeding a shot of the remaining 5 weight percent, based on total monomer feeds, of the ethylenically unsaturated monomer from a second monomer vessel into the first monomer vessel; and then feeding the adjusted monomer feed into the reaction container. A hydroxyl group-containing compound may be fed with the monomer containing carboxylic acid groups, anhydride groups, or salts thereof, and/or with the ethylenically unsaturated monomer in the first and/or second monomer feed. The proportion of the monomer containing carboxylic acid groups, anhydride groups, or salts thereof, the ethylenically unsaturated monomer, and the optional hydroxyl group-containing compound in the first monomer vessel, both before and after adjustment of the monomer feed composition, may be selected to obtain the desired polymer product. The duration of the first feed period may be greater than or equal to zero time. Use of this embodiment of the invention may result in a curable composition containing substantially no gel to small amounts of gel.

In a different embodiment of the invention, a monomer feed composition containing the monomer containing carboxylic acid groups, anhydride groups, or salts thereof; the ethylenically unsaturated monomer having a solubility of less than 2 g/100 g of water at 25° C.; and optionally the hydroxyl-group containing compound, is fed from a first monomer vessel into the reaction container, during a first feed period. The composition of the monomer feed remains substantially the same during the first feed period. The composition of the monomer feed is then adjusted. The monomer feed composition adjustment is implemented by continuously feeding additional ethylenically unsaturated monomer; additional monomer containing carboxylic acid groups, anhydride groups, or salts thereof; and optionally additional hydroxyl group-containing compound, or a combination thereof, from at least one second monomer vessel into the monomer feed in the first monomer vessel. During at least one second feed period, the adjusted monomer feed is fed from the first monomer vessel into the reaction container. During the second feed period, the additional monomer continues to be continuously fed into the first monomer vessel. A non-limiting example of a suitable feed profile may be, for example, during a first feed period, feeding a monomer feed of 90 weight percent, based on total monomer feeds, of the monomer containing carboxylic acid groups, anhydride groups, or salts thereof, and 5 weight percent, based on total monomer feeds, of the ethylenically unsaturated monomer, from a first monomer vessel into a reaction container; continuously feeding the remaining 5 weight percent, based on total monomer feeds, of the ethylenically unsaturated monomer from a second monomer vessel into the first monomer vessel, while simultaneously feeding the adjusted monomer feed into the reaction container. A hydroxyl group-containing compound may be fed with the monomer containing carboxylic acid groups, anhydride groups, or salts thereof, and/or with the ethylenically unsaturated monomer in the first and/or second monomer feed. The proportion of the monomer containing carboxylic acid groups, anhydride groups, or salts thereof, the ethylenically unsaturated monomer, and the optional hydroxyl-group containing compound in the first monomer vessel, before, during and after adjustment of the monomer feed composition, may be selected to obtain the desired polymer product. The duration of the first feed period may be greater than or equal to zero time. Use of this embodiment of the invention may result in a curable composition containing substantially no gel.

In yet another embodiment of the invention, the monomers are fed by a semi-continuous feed. Semi-continuous feed processes are well known in the art. In this embodiment of the invention, the monomers are fed, along with the other reaction raw materials, during two or more cycles. By "cycle" is meant herein the period during which sufficient monomer is fed to the reaction container to provide a desired batch size having a desired composition. The feed profile used in each cycle may be different, or the same. Suitable feed profiles for each cycle include, for example, those described hereinabove. In this embodiment, during a first cycle, a monomer feed, having a first monomer feed profile is fed to the reaction container for the desired first cycle time. At the end of the first cycle, at least one second cycle begins, during which a monomer feed having a second monomer feed profile is fed to the reaction container for the desired second cycle time. At some point during, or after reaction of the first cycle in the reaction container, the contents of the reaction container are partially or completely transferred into at least one second vessel.

The polymerization reaction to prepare the copolymer component can be initiated by various methods known in the art, such as, for example, by using the thermal decomposition of an initiator, or by using an oxidation-reduction reaction ("redox reaction") to generate free radicals to effect the polymerization. Typically, redox initiator systems contain at least one peroxide-containing compound in combination with a redox co-initiator, for example, a reductive sulfur compound such as a bisulfite, sulfite, thiosulfate, dithionite, or tetrathioate of alkali metals and ammonium compounds. Thus, it is possible to employ combinations of peroxodisulfates with alkali metal hydrogen sulfites or ammonium hydrogen sulfites, for example, ammonium peroxydisulfate and ammonium disulfite. The ratio of peroxide-containing compound to redox co-initiator is typically from 30:1 to 0.05:1.

In combination with the initiators, and/or redox initiator systems, it is possible to use, in addition, transition metal catalysts, such as salts of iron, cobalt, nickel, copper, vanadium, and manganese. Suitable salts include, for example, iron (II) sulfate, cobalt (II) chloride, nickel (II) sulfate, and copper (I) chloride. The reductive transition metal salt may be used in a concentration of from 0.1 to 1,000 ppm, based on the monomers in the curable composition.

If the reaction mixture is initially polymerized partly at the lower limit of the temperature range appropriate for polymerization, and is then polymerized to completion, at a higher temperature, it is expedient to use at least two different initiators, which decompose at different temperatures, so that there is sufficient concentration of free radicals available within each temperature range.

The copolymer component can be prepared in solvent/water mixtures such as, for example, i-propanol/water, tetrahydrofuran/water, and dioxane/water.

To prepare polymers of low average molecular weight, it is often expedient to carry out copolymerization in the presence of regulators. Customary regulators may be used, for example, organic compounds containing SH groups, such as 2-mercaptoethanol, 2-mercaptopropanol, mercaptoacetic acid or esters thereof, mercaptopropionic acid or esters thereof, tert-butylmercaptan, n-octylmercaptan, n-dodecylmercaptan, and tert-dodecymercaptan; $C_1$-$C_4$ aldehydes, such as acetaldehyde, propionaldehyde; hydroxylammonium salts, such as hydroxylammonium sulfate; formic acid; sodium bisulfite or isopropanol. The copolymer component may be formed in the presence of a phosphorous-containing regulator, such as, for example, hypophosphorous acid and its salts, as is disclosed in U.S. Pat. No. 5,294,686, so as to incorporate the optional phosphorous-containing species in the polymer molecule. The regulators are generally used in amounts of from 0 to 40 weight percent, preferably from 0 to 15 weight percent, based on the weight of the monomers in the curable composition.

The carboxylic acid groups, anhydride groups, or salts thereof of the copolymer component of the curable composition may be neutralized with a base. In one embodiment of the invention, the carboxylic acid groups, anhydride groups, or salts thereof may be neutralized with a fixed base. By "fixed" base is meant herein, a base which is substantially non-volatile under the conditions of treatment of the substrate with the curable composition. Suitable fixed bases include, for example, sodium hydroxide, potassium hydroxide, sodium carbonate, and t-butylammonium hydroxide. The fixed base is sufficiently nonvolatile that it will substantially remain in the curable composition during heating and curing operations. Preferably, the amount of fixed base utilized is such that the carboxylic acid groups, anhydride groups, or salts thereof of the copolymer component of the curable composition are neutralized to an extent of less than 35%, more preferably less than 20%, even more preferably less than 5%, calculated on an equivalents basis. When the half ester of a dicarboxylic acid, or the anhydride of a dicarboxylic acid is used, the equivalents of acid are calculated to be equal to those of the corresponding dicarboxylic acid.

In a different embodiment of the invention, the carboxylic acid groups, anhydride groups, or salts thereof may be neutralized with a volatile base. By "volatile base" is meant herein a base which is substantially volatile under the conditions of treatment of the substrate with the curable composition, Suitable volatile bases include, for example, ammonia or volatile lower alkyl amines. The volatile base can be used in addition to the fixed base. Fixed multivalent bases such as, for example, calcium carbonate, may tend to destabilize an aqueous dispersion if the copolymer component is used in the form of an aqueous dispersion, but they can be used in minor amount.

Neutralization of the carboxylic acid groups, anhydride groups, or salts thereof of the copolymer component of the curable composition may be achieved by contacting the copolymer component with a volatile and/or fixed base, before, during, or after the preparation of the curable composition. Neutralization may be partially effected during formation of the copolymer component. The neutralization may at least partially occur prior to, or while treating a substrate.

In one embodiment of the invention, the curable composition has a low pH of preferably no greater than 3.5, more preferably 2.5 or less, and even more preferably 2 or less. The low pH may be obtained, for example, by adding a suitable acid, preferably a strong acid to the curable composition. The strong acid may be a mineral acid, such as, for example, sulfuric acid, or an organic acid, such as, for example sulfonic acid. Mineral acids are preferred. When a low pH curable composition is utilized, it is preferred that the copolymer have a low molecular weight of preferably less than 10,000, more preferably less than 5,000, and even more preferably around 3,000 or less, with about 2,000 being advantageous.

As noted above, in one embodiment of the invention, the hydroxyl group-containing compound, and the polyacid copolymer containing the copolymerized carboxylic acid or anhydride group-containing compound and ethylenically unsaturated monomer having a solubility in water of less than 2 g/100 g of water at 25° C., are independent components of the curable composition. In this embodiment, the curable composition may be prepared by admixing the polyacid copolymer, the hydroxyl group-containing compound, and the optional phosphorous-containing compound, using conventional mixing techniques. The polyacid copolymer is sufficiently nonvolatile that it will substantially remain available for reaction with the hydroxyl group-containing compound in the curable composition, during heating and curing operations. Additionally, the hydroxyl group-containing compound is sufficiently nonvolatile that it will substantially remain available for reaction with the polyacid copolymer in the composition, during heating and curing operations. Further, in this embodiment, the hydroxyl group-containing compound bears at least two hydroxyl groups. The hydroxyl group-containing compound can be any such compound having a molecular weight less than 1000, such as, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, β-hydrozyalkylamides such as, for example, bis-[N,N-di(β-hydroxyethyl)] adipamide, as can be prepared according to the teachings of U.S. Pat. No. 4,076,917. Preferably, the hydroxyl group-containing compound is a hydroxyl-containing amine. The hydroxyl group-containing compound can be an addition polymer, such as, for example, polyvinyl alcohol, partially hydrolyzed polyvinyl acetate, and homopolymers or copolymers of hydroxy alkyl acrylate monomers such as hydroxy methyl acrylate, hydroxyethyl (meth)acrylate, hydroxypropyl (meth)acrylate, hydroxy butyl acrylate, and hydroxy alkyl methacrylates; ethylenically unsaturated poly-hydroxy monomers such as, for example, polyethylene glycol mono-methacrylate; a hydroxyl group-bearing monomer of Formula I, $$CH_2=C(R1)CH(R2)OR3 \quad (I)$$

wherein R1 and R2 are independently selected from hydrogen, methyl, and —CH2OH; and R3 is selected from hydrogen, —CH2CH(CH3)OH, —CH2CH2OH, —C(CH2OH)2C2H5, and (C3-C12) polyol residues; of Formula II,

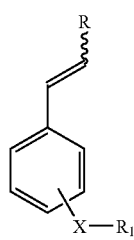

(II)

wherein R is selected from $CH_3$, Cl, Br, and $C_8H_5$; and R1 is selected from H, OH, CH2OH, CH(CH$_3$)OH, glycidyl, CH(OH)CH$_2$OH, and (C$_3$-C$_{12}$)polyol residues; and the like. Preferred hydroxyl-containing compounds include, as copolymerized units, allyl alcohol or 3-allyloxy-1,2-propanediol.

In a different embodiment of the invention, the acid monomer, the ethylenically unsaturated monomer having a solubility in water of less than 2 g/100 g of water at 25° C., and the hydroxyl group-containing compound, are incorporated within the same polymer backbone. In this embodiment of the invention, the curable composition contains a polyacid copolymer containing, as polymerized units, an acid monomer containing carboxylic acid groups, anhydride groups, or salts thereof; from about 3 to about 25 weight percent, based on the total weight or polymerized monomers in the curable composition, of an ethylenically unsaturated monomer having a solubility of less than 2 g/100 g of water; and a hydroxyl group-containing compound. Suitable hydroxyl group-containing compounds include, for example, ethylenically unsaturated mono-hydroxy functional monomers such as, for example, hydroxy alkyl acrylate monomers such as hydroxy methyl acrylate, hydroxy ethyl acrylate, 2-hydroxy ethyl acrylate, hydroxy propyl acrylate, hydroxy butyl acrylate, and hydroxy alkyl methacrylates; ethylenically unsaturated poly-hydroxy monomers such as, for example, polyethylene glycol monomethacrylate; compounds of Formula I, $$CH2=C(R1)CH(R2)OR3 \quad (I)$$

wherein R1 and R2 are independently selected from hydrogen, methyl, and —CH2OH; and R3 is selected from hydrogen, —CH2CH(CH3)OH, —CH2CH2OH, —C(CH2OH)2C2H5 and (C3-C12) polyol residues; compounds of Formula II,

(II)

wherein R is selected from CH3, Cl, Br, and C6H5; and R1 is selected from H, OH, CH2OH, CH(CH3)OH, glycidyl, CH(OH)CH2OH, and (C3-C12)polyol residues; and the like, and combinations thereof. The hydroxyl-containing compound may be a mono- or di-saccharide, or a condensation polymer, such as a polysaccharide, which when hydrolyzed, yields a monosaccharide, such as in the case of starches and cellulosics. The hydroxyl-containing compound is preferably used at a level of from 1% to 99%, more preferably at a level of from 10% to 90% by weight, based on the weight of the polymer. Preferred hydroxyl group-containing monomers are allyl alcohol, trimethylolpropane allyl ether, and 3-allyloxy-1,2-propanediol.

Monomers of Formula I and Formula II can be prepared by a variety of synthetic routes known to those skilled the art. For example, allyl chloride can be reacted with various polyhydroxy compounds to give, for example, the corresponding allyloxy derivatives of sugars, glycerine, erythritol and pentaerythritol. Alternatively, allyl alcohol can be reacted with various halomethyl derivatives, especially chloromethyl compounds, to prepare allyloxy derivatives; for example, the reaction of allyl alcohol with epichlorohydrin would produce 3-allyloxy-1,2-propanediol. Vinyl glycols, such as 1-butene-3,4-diol, for example, can be prepared by methods such as those described in U.S. Pat. No. 5,336,815. Allyloxy compounds that would hydrolyze to allyloxy compounds of Formula I under the conditions of aqueous polymerization, for example allyl glycidylether, are also useful as monomers to produce polymer additives of the present invention.

The ($C_3$-$C_{12}$)-containing polyols useful to prepare allyloxy compounds of Formula I include, for example, ($C_3$-$C_6$)-polyhydroxy compounds such as erythritol, pentaerythritol and glycerine; and sugar alcohols such as xylitol, sorbitol and mannitol. Additional suitable ($C_3$-$C_{12}$)-containing polyols include, for example, polyhydroxy aldehyde and ketone sugars such as glucose, fructose, galactose, maltose, sucrose, lactose, erythrose and threose. Examples of suitable unsaturated non-ionizable monomers, including representative examples of monomers based on ($C_3$-$C_{12}$)-containing polyols (compounds [5], [6], [7], [8], [9], [10] and [12]; see $R^3$ groups) are presented in Table I. The prefixes "($C_3$-$C_{12}$)-" and "($C_3$-$C_6$)-," as used herein, refer to organic compounds or structural portions of organic compounds containing 3 to 12 carbon atoms and 3 to 6 carbon atoms, respectively. The terms "polyol" and "polyhydroxy," as used herein, refer to organic compounds or structural portions of organic compounds containing two or more hydroxy groups.

prepared from ethylenically unsaturated monomers, in the presence of phosphorous salt chain transfer agents or terminators; and addition polymers containing acid-functional monomer residues such as, for example, copolymerized phosphoethyl methacrylate, and like phosphonic acid esters, and copolymerized vinyl sulfonic acid monomers, and their salts. In one embodiment of the invention, the hydroxyl-containing compound, and the phosphorous-containing compound are present in the same addition polymer. The phosphorous-containing species can be used at a level of from 0% to 40%, preferably from 0% to 15%, further preferably from 0% to 10%, more preferably from 0% to 5%, and furthermore preferably from 0% to 0.5% by weight, based on the weight of total polymer in the curable composition.

In some embodiments alkanolamines are included in the curable composition. In certain embodiments, the salts of the carboxy-group are salts of functional alkanolamines, with at least two hydroxyl groups such as, for example, diethanolamine, triethanolamine, dipropanolamine, and di-isopropanolamine.

The curable composition can contain, in addition, conventional treatment components such as, for example, emulsifiers; pigments; fillers or extenders; anti-migration aids; curing

TABLE I

| Formula I Monomer | $R^1$ | $R^2$ | $R^3$ |
|---|---|---|---|
| allyl alcohol [1] | —H | —H | —H |
| methallyl alcohol [2] | —$CH_3$ | —H | —H |
| allyloxyethanol [3] | —H | —H | —$CH_2CH_2OH$ |
| allyloxypropanol [4] | —H | —H | —$CH_2CH(CH_3)OH$ |
| 3-allyloxy-1,2-propanediol [5] | —H | —H | —$CH_2CH(OH)CH_2OH$ |
| allyloxy(sugar) [6] | —H | —H | -sugar residue |
| allyloxy(glucose) [7] | —H | —H | —$CH_2[CH(OH)]_4C(=O)H$ |
| allyloxy(fructose) [8] | —H | —H | —$CH_2[CH(OH)]_3C(=O)CH_2OH$ |
| erythritol monoallyl ether [9] | —H | —H | —$CH_2[CH(OH)]_2CH_2OH$ |
| pentaerythritol monoallyl ether [10] | —H | —H | —$CH_2C(CH_2OH)_3$ |
| 1-butene-3,4-diol [11] | —H | —$CH_2OH$ | —H |
| Trimethylolpropane allyl ether [12] | —H | —H | —$C(CH2OH)2C2H5$ |

In the curable composition, the ratio of the number of equivalents of carboxy, anhydride, or salts thereof, to the number of equivalents of hydroxyl is from about 1/0.01 to about 1/3. An excess of equivalents of carboxy, anhydride, or salts thereof, to the equivalents of hydroxyl is preferred. The more preferred ratio of the number of equivalents of carboxy, anhydride, or salts thereof, to the number of equivalents of hydroxyl, is from 1/0.2 to 1/1. The most preferred ratio of the number of equivalents of carboxy, anhydride, or salts thereof, to the number of equivalents of hydroxyl, is from 1/0.2 to 1/0.8.

In one embodiment of the invention, the curable composition includes a phosphorous-containing compound. The phosphorous-containing compound may be admixed with, or copolymerized with the components of the curable composition. Suitable phosphorous-containing compounds include, for example, an alkali metal hypophosphite salt such as for example sodium hypophosphite, an alkali metal phosphite, an alkali metal polyphosphate, an alkali metal dihydrogen phosphate, a polyphosphoric acid, an alkyl phosphinic acid, or combinations thereof. The phosphorous-containing compound may be an oligomer, or polymer, bearing phosphorous-containing groups, such as, for example, an addition polymer of acrylic and/or maleic acid formed in the presence of sodium hypophosphite; addition polymers such as, for example, the copolymer component of the present invention, agents; coalescents; surfactants, particularly nonionic surfactants; spreading agents; mineral oil dust suppressing agents; biocides; plasticizers; organosilanes; anti-foaming agents such as dimethicones, silicone oils and ethoxylated nonionics; corrosion inhibitors, particularly corrosion inhibitors effective at pH<4 such as thioureas, oxalates, and chromates; colorants; antistatic agents; lubricants; waxes; anti-oxidants; coupling agents such as silanes, particularly Silquest™ A-187 (manufactured by GE Silicones—OSi Specialties, located in Wilton CT); polymers not of the present invention; and waterproofing agents such as silicones and emulsion polymers, particularly emulsion polymers containing, as copolymerized units, greater than 30% by weight, based on the weight of the emulsion polymer solids, ethylenically unsaturated acrylic monomer containing a $C_5$ or greater alkyl group.

In the preferred embodiment, the curable composition of the present invention is a formaldehyde-free curable composition. By "formaldehyde-free composition", is meant herein, the composition is substantially free from formaldehyde, and does not liberate substantial amounts of formaldehyde as a result of drying and/or curing. In order to minimize the formaldehyde content of the curable composition, it is preferred, when preparing the formaldehyde-free curable composition, to use polymerization adjuncts, such as, for example, initiators, reducing agents, chain transfer agents, biocides, surfactants, and the like, that are themselves free from formaldehyde, do not generate formaldehyde during the polymerization process, and do not generate or emit formaldehyde during the treatment of a substrate.

The method of the present invention is directed toward a method for treating a substrate by forming the curable composition of the present invention, contacting the substrate with the curable composition, and heating the curable composition at a temperature of from 100° C. to 400° C. The substrate is contacted with the curable composition by methods commonly described as, for example, coating, sizing, saturating, bonding, combinations thereof, and the like. Typical substrates include, for example, wood, including, for example, solid wood, wood particles, fibers, chips, flour, pulp, and flakes; metal; plastic; fibers such as glass fibers; woven and nonwoven fabrics; and the like. The curable composition can be applied to a substrate by conventional techniques such as, for example, air or airless spraying, padding, saturating, roll coating, curtain coating, beater deposition, coagulation, or the like.

In one embodiment of the invention, the curable composition is used as a binder for heat-resistant nonwoven fabrics, such as, for example, nonwoven fabrics containing heat-resistant fibers, such as, aramid fibers; ceramic fibers; metal fibers; carbon fibers; polyimide fibers; certain polyester fibers; rayon fibers; rock wool; and glass fibers, including glass fiber-containing heat-resistant nonwoven fabrics which are impregnated with a hot asphaltic composition, typically at temperatures of from 150° C. to 250° C., pursuant to making roofing shingles or roll roofing materials. By "heat-resistant fibers" is meant herein, fibers that are substantially unaffected by exposure to temperatures above 125° C. Heat-resistant nonwoven fabrics can also contain fibers that are not in themselves heat-resistant, such as, for example, certain polyester fibers, rayon fibers, nylon fibers, and superabsorbent fibers, in so far as they do not materially adversely affect the performance of the substrate.

Nonwoven fabrics are composed of fibers that can be consolidated by purely mechanical means such as, for example, by entanglement caused by needle-punching, by an air-laid process, or by a wet-laid process; by chemical means, such as, for example, treatment with a polymeric binder; or by a combination of mechanical and chemical means before, during, or after nonwoven fabric formation.

The heat-resistant nonwovens can be used for applications such as, for example, insulation batts or rolls, as reinforcing mat for roofing or flooring applications, as roving, as microglass-based substrate for printed circuit boards or battery separators, as filter stock, as tape stock, as reinforcement scrim in cementitious and non-cementitious coatings for masonry, in ceiling tiles, cellulosic roofing tiles, window treatments, wall coverings, molded parts, for curly pulp modification, for powder coating, and the like.

In a different embodiment of the invention, the curable composition is used as a binder for a wood-containing article, such as, for example, paper filters and consolidated wood composite articles having structural integrity, such as wood chipboard, wood fiberboard, and the like.

After the curable composition has been applied to a substrate, it is heated to effect drying and curing. By "curing" is meant herein a chemical or morphological change that is sufficient to alter the properties of the polymer, such as, for example, via covalent chemical reaction, ionic interaction or clustering, improved adhesion to the substrate, phase transformation or inversion, hydrogen bonding, and the like. The duration, and temperature of heating, will affect the rate of drying, ease of processing or handling, and property development of the treated substrate. Heat treatment at from 100° C. to 400° C. for a period of time of from 3 seconds to 15 minutes can be carried out. For most substrates, treatment at from 175 ° C. to 280 ° C. is preferred. Where the substrate contains wood, temperatures of 100° C. to 220° C., are preferred. The drying and curing functions can be effected in two or more distinct steps, if desired. For example, the curable composition can be first heated at a temperature, and for a time, sufficient to substantially dry, but not to substantially cure the composition, and then heated for a second time, at a higher temperature, and/or for a longer period of time, to effect curing. Such a procedure, referred to as "B-staging", can be used to provide binder-treated nonwovens, for example, in roll form, which can at a later stage be cured, with or without forming or molding into a particular configuration, concurrent with the curing process.

As is well known in the art, poly acid-containing polymers can be corrosive to certain types of processing equipment, particularly those made from soft steel. Accordingly, when handling solutions containing such polymers, certain types of corrosion control is preferably practiced. These practices can include, for example, pH control, or the use of materials such as stainless steel in the process equipment itself instead of more corrosive material.

The following examples illustrate the invention. Abbreviations used throughout are:

| Abbreviation | |
|---|---|
| AA | Acrylic acid |
| MMA | Methyl methacrylate |
| BA | Butyl acrylate |
| EA | Ethyl acrylate |
| EHA | Ethyl hexyl acrylate |
| STY | Styrene |
| 0.15% $FeSO_4$ | 0.15% Ferrous Sulfate heptahydrate in deionized water |
| NaPS | Sodium persulfate |
| PPA | Phenyl phosphonic acid |
| SMBS | Sodium metabisulfite |
| SBS | Sodium bisulfite |
| SHP | 45% Sodium hypophosphite monohydrate |
| $H_2O_2$ | Hydrogen peroxide |
| IPA | Isopropanol |
| DI $H_2O$ | Deionized water |
| EM Quant ® peroxide test strips | Catalog number 10011-1 |
| TEA | Triethanolamine |
| SEC | Size exclusion chromatography |
| HPLC | High performance liquid chromatography |
| GC | Headspace gas chromatography |
| Mn | Number average molecular weight |
| Mw | Weight number average |

COMPARATIVE EXAMPLE A

A 100% PolyAA homopolymer having a molecular weight of 5,000 was prepared.

EXAMPLE B

Preparation of Poly(92 AA/8 STY) by Solution Polymerization

Poly(AA/STY) copolymer was prepared by a gradual addition solution polymerization process in a 1-liter round bottom flask that had four necks, and was equipped with a mechanical stirrer, condenser, temperature control device, initiator feed lines and a nitrogen inlet. The specific amounts of kettle ingredients are in Table 1. The first kettle feed mixture, containing DI $H_2O$ and IPA was fed to the kettle, and heated to 83° C., while stirring under a nitrogen purge. Upon reaching 83° C., the second kettle feed mixture, containing PPA and STY, was introduced into the reaction flask with stirring. The AA and STY monomer mixture, and the initiator mixture, containing NaPS and DI $H_2O$, were co-fed separately over a 120 minute period. A chain transfer agent solution was run over 30 minutes. The reaction was allowed to run at 82° C. Upon completion of the feeds, the reaction mixture was maintained at the reaction temperature for a period of 30 minutes. The reaction was then heated to 100° C., until all of the IPA had been distilled off. During this time, deionized water was added. The resulting copolymer was characterized for solids and molecular weight, by aqueous size exclusion chromatography (SEC). Polymer characterization data is in Table 1.

COMPARATIVE EXAMPLE C

A Poly(70AA/30EA) copolymer having a molecular weight of 9,400 was prepared.

EXAMPLES D AND K

Preparation of Poly(90 AA/10 BA) by Gradual Addition Solution Polymerization

Poly(AA/BA) copolymers were prepared by a gradual addition solution polymerization process in a 5-liter round bottom flask that had four necks, and was equipped with a mechanical stirrer, condenser, temperature control device, initiator feed lines and a nitrogen inlet. The specific amounts of kettle ingredients are in Table 1. The first kettle feed of DI $H_2O$ was heated to 73° C., while stirring under a nitrogen purge. Upon reaching 73° C., the second kettle feed mixture, containing $FeSO_4$, SMBS, and DI $H_2O$, was introduced into the reaction flask, with stirring. The AA, BA and DI $H_2O$ monomer mixture was co-fed over a 120 minute period; the initiator mixture, containing NaPS and DI $H_2O$, was co-fed over a 122 minute period; and the SMBS mixture, containing SMBS and DI H2O, was co-fed over a 115 minute period. The reaction was allowed to run at 73° C. Upon completion of the feeds, the reaction mixture was maintained at the reaction temperature for a period of 20 minutes. After the 20 minute hold, the reaction was cooled to 65° C., and then DI $H_2O$ was added. The resulting copolymer was characterized for solids and molecular weight, by aqueous size exclusion chromatography (SEC). Polymer characterization data is in Table 1.

COMPARATIVE EXAMPLES E, F AND G

A Poly(31AA/61STY/8MMA) copolymer having a molecular weight of 4,000 (Example E); a Poly(30AA/70EHA) copolymer having a molecular weight of 30,000 (Example F); and a Poly(99AA/1BA) copolymer having a molecular weight of 6,100 (Example G), were prepared.

EXAMPLE H

Preparation of Poly(90 AA/10 MMA) by Gradual Addition Solution Polymerization

Poly(AA/MMA) copolymer was prepared by a gradual addition solution polymerization process in a 5-liter round bottom flask that had four necks, and was equipped with a mechanical stirrer, condenser, temperature control device, initiator feed lines and a nitrogen inlet. The specific amounts of kettle ingredients are in Table 1. The first DI H2O kettle feed was fed to the kettle, and heated to 73° C., while stirring under a nitrogen purge. Upon reaching 73° C., the second kettle feed mixture, containing $FeSO_4$, SMBS, and DI $H_2O$, was introduced into the reaction flask, with stirring. The AA, MMA and DI $H_2O$ monomer mixture was co-fed over a 90 minute period; the initiator mixture, containing NaPS and DI $H_2O$ was co-fed over a 92 minute period; and the SMBS mixture, containing DI $H_2O$ and SMBS, was co-fed over a 85 minute period. The reaction was allowed to run at 73° C. Upon completion of the feeds, the reaction mixture was maintained at the reaction temperature, for a period of 20 minutes. After the 20 minute hold the reaction was cooled to 65° C. and a chase of NaPS and DI $H_2O$ was added. The reaction was held another 20 minute and cooled to below 50° C. with dilution water. The resulting copolymer was characterized for solids molecular weight, by aqueous size exclusion chromatography (SEC). Polymer characterization data is in Table 1.

COMPARATIVE EXAMPLE I

A 100% PolyAA homopolymer having a molecular weight of 23,000, was prepared.

EXAMPLE J

Preparation of Poly(80 AA/20 EA) by Gradual Addition Solution Polymerization

Poly(AA/EA) copolymer was prepared by a gradual addition solution polymerization process in a 5-liter round bottom flask that had four necks, and was equipped with a mechanical stirrer, condenser, temperature control device, initiator feed lines and a nitrogen inlet. The specific amounts of kettle ingredients are in Table 1. The kettle mixture, containing DI $H_2O$ and SHP, was fed to the kettle, and heated to 92° C., while stirring under a nitrogen purge. Upon reaching 92° C., the AA, EA and DI $H_2O$ monomer mixture, SHP, and the initiator mixture containing NaPS and DI $H_2O$, were all co-fed separately, over a 122 minute period. The reaction was allowed to run at 92° C. Upon completion of the feeds, the reaction mixture was maintained at the reaction temperature for a period of 30 minutes. The reaction mixture was then cooled to 70° C., and diluted with DI water. The resulting copolymer was characterized for solids and molecular weight, by aqueous size exclusion chromatography (SEC). Polymer characterization data is in Table 1.

EXAMPLE L

A 1:1 blend of Example A and Example K was prepared, and polymerized, resulting in a Poly(95AA/5BA) copolymer.

TABLE 1

Polymerization Ingredients & Polymer Characterization

| | Ingredients | Amount (g) Eg. B (92 AA/8 STY) | Eg. D (90 AA/10 BA) | Eg. H (90 AA/10 MMA) | Eg. J (80 AA/20 EA) | Eg. K (90 AA/10 BA) |
|---|---|---|---|---|---|---|
| Kettle Feed 1 | DI H$_2$O | 30 | 1514.2 | 1070.6 | 595 | 713.8 |
| | IPA | 200 | | | | |
| | SHP | | | | 35 | |
| Kettle Feed 2 | PPA | 3.6 | | | | |
| | STY | 1.5 | | | | |
| | 0.15% FeSO4 | | 20.3 | 17.1 | | 11.4 |
| | SMBS | | 5.4 | 4.2 | | 2.7 |
| | DI H$_2$O | | 30.1 | 14.3 | | 9.5 |
| Monomer Mixture | AA | 186.5 | 1985.7 | 1541 | 1200 | 1027.3 |
| | STY | 15 | | | | |
| | EA | | | | 300 | |
| | BA | | 220.6 | | | 114.1 |
| | MMA | | | 171.2 | | |
| | DI H$_2$O | | 386.6 | 370 | 365 | 200 |
| Accelerator | SHP | | | | 35 | |
| Initiator Mixture | NaPS | 6 | 40.8 | 31.65 | 15 | 21.1 |
| | DI H$_2$O | 26.5 | 222.3 | 203 | 93 | 115 |
| SMBS Mixture | SMBS | | 84.7 | 65.7 | | 43.8 |
| | DI H$_2$O | | 158.5 | 180 | | 100.4 |
| Chain Transfer Agent Solution | PPA | 6.6 | | | | |
| | DI H$_2$O | 62.5 | | | | |
| | IPA | 62.5 | | | | |
| Diluent | DI H$_2$O | 60 | 193.3 | 100 | 635 | 146.5 |
| Polymer Mn | | 3,000 | 3,480 | 3,240 | 4,074 | 3,570 |
| Polymer Mw | | 11,000 | 13,900 | 13,000 | 38,000 | 13,900 |
| Polymer % Solids | | 48.4% | 50.1% | 48.9% | 47.2% | 50.5% |

Treatment of Glass Microfiber Filter Paper and Tensile Testing of Treated Substrate Curable compositions were prepared from polyacid homopolymer and polyacid copolymers to provide a 5 weight % binder solution. The pH of the aqueous dispersions or solutions were adjusted to that of a standard polyacid curable binder which contains, poly(acrylic acid), triethanolamine (TEA), and sodium hypophosphite (SHP) (Table 2). Glass microfiber filter paper sheets (20.3×25.4 cm, Cat No. 1820 866, Whatman International Ltd., Maidstone, England) were dipped in binder solution (200 g) and run through a roll padder with roll pressures of 10 lbs. The coated sheets were then heated at 90° C. for 90 sec in a Mathis oven. Post drying weight was determined to calculate binder add-on (dry binder weight as a percentage of filter paper weight.) All sheets had about 11% of binder add-on. The dried sheets were then cured in a Mathis oven at specified times and temperatures.

The cured sheets were cut into 1 inch (cross machine direction) by 4 inch (machine direction) strips, and tested for tensile strength, in the machine direction, in a Thwing-Albert Intelect 500 tensile tester. The fixture gap was 2 inches, and the pull rate was 2 inches/minute. Strips were tested either "as is" (dry tensile), or immediately after a 30 minute soak in water at 85° C. (10 min and 30 min wet tensile, respectively.) Tensile strengths were recorded as the peak force measured during parting (Table 3). Data reported are averages of seven test strips and are presented relative to a standard formulation (A), which is assigned a value of 100%.

TABLE 2

Sample Formulations

| Sample | % Composition | Wt. % TEA[1] | Wt % SHP[2] | Molecular Weight |
|---|---|---|---|---|
| Comp[3]-A | 100 AA | 36 | 5.4 | 5,000 |
| B | 92 AA/8 STY | 34 | 5.9 | 11,000 |
| Comp-C | 70 AA/30 EA | 35 | 4.4 | 9,400 |
| D | 90 AA/10 BA | 33 | 13.1 | 13,900 |
| Comp-E | 31 AA/61 STY/ 8 MMA | 11 | 5.4 | 4,000 |
| Comp-F | 30 AA/70 EHA | 9 | 5.4 | 30,000 |
| Comp-G | 99 AA/1 BA | 35 | 6.0 | 6,100 |
| H | 90 AA/10 MMA | 31 | 10.7 | 13,000 |
| Comp-I | 100 AA | 35 | 9.8 | 23,000 |
| J | 80 AA/20 EA | 33 | 9.5 | 38,000 |
| K | 90 AA/10 BA | 33 | 12.5 | 13,900 |
| L | 95 AA/5 BA | 35 | 9.5 | 14,000 (large mode) 5,000 (small mode) |

[1]Based on dry weight of polymer
[2]Weight of SHP based on dry weight of polymer
[3]"Comp" means comparative example

TABLE 3

Tensile Strength Normalized to 100% AA

| Sample | Temp C. | Rel. Dry Tensile | Rel. Hot Wet Tensile | Cure Time |
|---|---|---|---|---|
| Comp-A | 190/210 | 100% | 100% | 30/60 sec. |
| B | 210 | 102% | 116% | 60 sec. |
| Comp-C | 210 | 100% | 100% | 30 sec |
| D | 210 | 106% | 128% | 60 sec |
| Comp-E | 210 | 61% | 60% | 60 sec |
| Comp-F | 210 | 15% | 18% | 60 sec. |
| Comp-G | 210 | 106% | 104% | 60 sec |
| H | 190 | 100% | 110% | 60 sec |
| Comp-I | 190 | 100% | 98% | 60 sec |
| J | 190 | 107% | 131% | 60 sec |
| K | 190 | 106% | 142% | 60 sec |
| L | 190 | 115% | 147% | 60 sec |

What is claimed is:

1. A curable composition comprising:
(a) a polyacid copolymer comprising as polymerized units, a monomer comprising carboxylic acid groups, anhydride groups, or salts thereof, and from about 3 to about 25 weight percent, based on the total weight of polymerized monomers in the curable composition, of an ethylenically unsaturated monomer having a solubility of less than 2 g/100 g of water at 25° C.,
which ethylenically unsaturated monomer is selected from the group consisting of ethyl (meth)acrylate, methyl methacrylate, butyl (meth)acrylate, styrene, α-methyl styrene, mono-alkyl (meth)acrylamide, and di-alkyl (meth)acrylamide; and
(b) a hydroxyl group-comprising compound bearing at least two hydroxyl groups as an independent compound or incorporated into the said polyacid copolymer backbone;
wherein the ratio of the number of equivalents of the said carboxylic acid groups, anhydride groups, or salts thereof to the number of equivalents of the said hydroxyl groups is from about 1/0.01 to about 1/3.

2. A curable composition as claimed in claim 1, further comprising:
(c) a polyacid homopolymer.

3. The curable composition of claim 1, wherein the said carboxylic acid groups, anhydride groups, or salts thereof are neutralized with a base selected from the group consisting of volatile base, fixed base, and a mixture thereof.

4. A curable composition as claimed in claim 1, wherein the said polyacid copolymer comprises as polymerized units:
(c) the said hydroxyl group-comprising compound.

5. The curable composition of claim 4, wherein the said hydroxyl group-comprising compound has a Formula I,

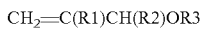

$$CH_2=C(R1)CH(R2)OR3 \qquad (I)$$

wherein R1 and R2 are independently selected from hydrogen, methyl, and —CH$_2$OH, and R3 is selected from hydrogen, —CH$_2$CH(CH$_3$)OH—, —CH$_2$CH$_2$OH, —C(CH$_2$OH)$_2$C$_2$H$_5$ and (C$_3$-C$_{12}$) polyol residues.

6. The curable composition of claim 1, wherein the said ethylenically unsaturated monomer is selected from the group consisting of from about 10 to about 25 weight percent ethyl (meth)acrylate, from about 10 about 20 weight percent methyl methacrylate, from about 3 to about 15 weight percent butyl (meth)acrylate, from about 3 to about 15 weight percent styrene, from about 3 to about 15 weight percent α-methyl styrene, from about 3 to about 8 weight percent t-octyl acrylamide, and from about 5 to about 15 weight percent t-butyl acrylamide, each weight percent based on the total weight of polymerized monomers in the curable composition.

7. The curable composition of claim 1, wherein the said ethylenically unsaturated monomer has a solubility in water of less than 1 g/100 g water at 25° C., and the said curable composition comprises from about 3 to about 15 weight percent, based on the total weight of polymerized monomers in the curable composition, of the said ethylenically unsaturated monomer.

8. The curable composition of claim 1, wherein the said ethylenically unsaturated monomer has a solubility in water of from 1 g/100 g to 2 g/100 g water at 25° C., and the said curable composition comprises from about 10 to about 25 weight percent, based on the total weight of polymerized monomers in the curable composition, of the said ethylenically unsaturated monomer.

9. The curable composition of claim 1, further comprising a phosphorous-containing compound.

10. The curable composition of claim 1, further comprising at least one low molecular weight polybasic carboxylic acid, anhydride, or salt thereof, having a molecular weight of 1000 or less.

11. The curable composition of claim 10, wherein the said hydroxyl-group comprising compound is an independent compound and the said low molecular weight polybasic carboxylic acid, anhydride, or salt thereof, is mixed with the said hydroxyl group-comprising compound, under reactive conditions, prior to mixing with the said polyacid copolymer.

12. The curable composition of claim 1, 10, or 11 wherein the said curable composition has a pH of no greater than 3.5.

13. A method of treating a substrate, comprising:
(i) forming the curable composition of claim 1;
(ii) contacting said substrate with the said curable composition; and
(iii) heating the said curable composition at a temperature of from 100° C. to 400° C.

14. An article prepared by the method of claim 13, wherein the said article is selected from the group consisting of a heat-resistant non-woven fabric, wood-containing article, and powder coated article.

* * * * *